US009375119B2

(12) United States Patent
Lee et al.

(10) Patent No.: US 9,375,119 B2
(45) Date of Patent: Jun. 28, 2016

(54) ROBOT CLEANER AND METHOD FOR CONTROLLING THE SAME

(71) Applicant: LG Electronics Inc., Seoul (KR)

(72) Inventors: Heungkyu Lee, Seoul (KR); Hyejeong Jeon, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 474 days.

(21) Appl. No.: 13/785,782

(22) Filed: Mar. 5, 2013

(65) Prior Publication Data

US 2013/0232717 A1 Sep. 12, 2013

(30) Foreign Application Priority Data

Mar. 9, 2012 (KR) .................. 10-2012-0024653

(51) Int. Cl.
G05B 15/00 (2006.01)
G05B 19/00 (2006.01)
(Continued)

(52) U.S. Cl.
CPC ............... *A47L 9/009* (2013.01); *B25J 9/0003* (2013.01); *B25J 9/1697* (2013.01); *G05D 1/0255* (2013.01); *G05D 2201/0203* (2013.01); *G05D 2201/0209* (2013.01); *Y10S 901/01* (2013.01)

(58) Field of Classification Search
CPC ....... A47L 9/009; B25J 9/0003; B25J 9/1697; G05D 1/0255; G05D 2201/0203; G05D 2201/0209; G05D 2201/0215; Y10S 901/01
USPC ............... 700/245, 258; 318/568.12; 704/275
See application file for complete search history.

(56) References Cited

U.S. PATENT DOCUMENTS 7,996,126 B2 * 8/2011 Hong ............................. 701/28
2004/0034533 A1 * 2/2004 Park et al. ..................... 704/275
(Continued)

FOREIGN PATENT DOCUMENTS

CN 101084817 A 12/2007
CN 101234012 A 8/2008
(Continued)

OTHER PUBLICATIONS

English machine Translation for reference CN101084817, Aug. 2012.*

*Primary Examiner* — Jason Holloway
*Assistant Examiner* — Rachid Bendidi
(74) *Attorney, Agent, or Firm* — Dentons US LLP

(57) ABSTRACT

Disclosed are a robot cleaner, and a method for controlling the same.
Firstly, a sound source direction and a sound source position may be detected by one or more microphones, e,g., three microphones, and a specific event sound may be recognized. Then, the recognized specific event sound may be output to a cleaner body in the form of a message, or may be provided via a communication network. This can allow the circumstances to be easily monitored.
Secondly, a sound recognition function may be updated using an ambient sound, for sound recognition from background noise and environmental noise, in a robust and precise manner. This can enhance a sound recognition rate, and improve stability and efficiency.
Thirdly, the robot cleaner may be moved to a detected direction or position of a sound source with respect to an event sound. Then, image information may be detected, or whether an abnormal situation has occurred or not may be determined. Such information may be provided via a communication network.

12 Claims, 5 Drawing Sheets

(51) Int. Cl.
  *A47L 9/00* (2006.01)
  *G05D 1/02* (2006.01)
  *B25J 9/00* (2006.01)
  *B25J 9/16* (2006.01)

(56) References Cited

U.S. PATENT DOCUMENTS

2005/0216122 A1* 9/2005 Tani .............................. 700/245
2005/0288079 A1* 12/2005 Tani ................................ 463/1
2010/0222925 A1* 9/2010 Anezaki ........................ 700/253
2014/0108569 A1* 4/2014 Sasamoto et al. ............. 709/206
2014/0178034 A1* 6/2014 Kim .............................. 386/230

FOREIGN PATENT DOCUMENTS

| | | |
|---|---|---|
| JP | 2007-122327 A | 5/2007 |
| JP | 2010-129078 | 6/2010 |
| KR | 10-2001-0106845 | 12/2001 |
| KR | 10-2004-0031580 | 4/2004 |
| KR | 10-0474340 | 3/2005 |
| KR | 10-2006-0127453 A | 12/2006 |

* cited by examiner

ROBOT CLEANER AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2012-0024653, filed on Mar. 9, 2012, the contents of which is incorporated by reference herein in its entirety.

BACKGROUND OF THE INVENTION

1. Field of the Invention

The present disclosure relates to a robot cleaner, and more particularly, to a robot cleaner having a sound recognition function and capable of detecting an abnormal situation using the same, and a method for controlling the same.

2. Background of the Invention

Generally, a robot has been developed for industrial use, and has managed some parts of factory automation. As the robot is applied to various fields recently, medical robots, space robots, home robots, etc. are being developed.

A representative of the home robot is a robot cleaner, a sort of home electronic appliance capable of performing a cleaning operation by sucking peripheral dust or foreign materials while autonomously moving on a predetermined region. Such robot cleaner is provided with a chargeable battery, and is provided with an obstacle sensor for avoiding an obstacle while moving.

A method for controlling such robot cleaner includes a method using a remote controller (user interface), a method using a button provided at a robot cleaner body, etc. Recently, a robot cleaner having a network function is being developed. Such robot cleaner is provided with a function to be remote-controlled by a cleaning command, or a function to monitor indoor situations. Further, being developed are mobile robots capable of recognizing a self position and creating a map using cameras or various types of sensors.

SUMMARY OF THE INVENTION

Therefore, an aspect of the detailed description is to provide a robot cleaner capable of detecting a sound source direction or a sound source position using one or more microphones, and capable of monitoring the circumstances by recognizing a specific event sound, and a method for controlling the same.

Another aspect of the detailed description is to provide a robot cleaner capable of recognizing an event sound in a robust and precise manner, by updating a sound recognition function using an ambient sound, and a method for controlling the same.

Still another aspect of the detailed description is to provide a robot cleaner capable of moving to a detected direction or position of a sound source with respect to an event sound, capable of detecting image information or determining whether an abnormal situation has occurred, and capable of providing such information via a communication network, and a method for controlling the same.

To achieve these and other advantages and in accordance with the purpose of this specification, as embodied and broadly described herein, there is provided a robot cleaner, comprising: a sound input unit having one or more microphones, and configured to receive an ambient sound; a sound recognition unit configured to recognize the received ambient sound, in a separation manner into an event sound and an environmental sound; and a message output unit configured to output a message corresponding to the event sound or the environmental sound. The robot cleaner may further comprise a control unit configured to detect a direction or a position of a sound source with respect to the event sound.

According to another embodiment of the present invention, there is provided a robot cleaner, comprising: a cleaner body; a driving unit having a wheel motor for driving one or more wheels installed at a lower part of the cleaner body, and configured to move the cleaner body according to a driving signal; a cleaning unit having a suction motor for sucking air, having a dust collecting means, and configured to suck foreign materials; a sound input unit having one or more microphones inside or outside the cleaner body, and configured to receive an ambient sound; a sound recognition unit configured to recognize the received ambient sound, in a separation manner into an event sound and an environmental sound; and a control unit configured to detect a direction or a position of a sound source with respect to the event sound, and configured to generate the driving signal.

The robot cleaner may further comprise an image detection unit configured to detect image information by capturing the periphery of the sound source position. The robot cleaner may further comprise a communication unit configured to transmit, via a communication network, the message, or the image information, or both of the message and the image information.

To achieve these and other advantages and in accordance with the purpose of this specification, as embodied and broadly described herein, there is also provided a method for controlling a robot cleaner, comprising: receiving an ambient sound using one or more microphones; recognizing the received ambient sound, in a separation manner into an event sound and an environmental sound; and outputting a message corresponding to the event sound or the environmental sound.

According to another embodiment of the present invention, there is provided a method for controlling a robot cleaner, comprising: receiving an ambient sound using one or more microphones; detecting a direction or a position of a sound source with respect to the event sound; recognizing the received ambient sound, in a separation manner into an event sound and an environmental sound; outputting a message corresponding to the event sound or the environmental sound; moving a robot cleaner to the sound source position; and detecting image information on the sound source position.

The present invention may have the following advantages.

Firstly, a sound source direction and a sound source position may be detected by one or more microphones, e.g., three microphones, and a specific event sound may be recognized. Then, the recognized specific event sound may be output to the cleaner body in the form of a message, or may be provided via a communication network. This can allow the circumstances to be easily monitored.

Secondly, a sound recognition function may be updated using an ambient sound, for sound recognition from background noise and environmental noise, in a robust and precise manner. This can enhance a sound recognition rate, and improve stability and efficiency.

Thirdly, the robot cleaner may be moved to a detected direction or position of a sound source with respect to an event sound. Then, image information may be detected, or whether an abnormal situation has occurred or not may be determined. Such information may be provided via a communication network.

Fourthly, in case of a model having a camera, whether an event sound has occurred or not may be detected. This can prevent the occurrence of a blind spot resulting from that the camera cannot capture an object within the range of 360°

Fifthly, a 24-hour automated security monitoring function may be executed with a 24-hour sound recognition service.

Sixthly, the present invention may be applied to a mobile robot in other field, e.g., a security robot for social security capable of providing a safe service to people by monitoring/securing a limited area independently or in an interworking manner with a security system, and by protecting a human life and property.

Seventhly, in the occurrence of a collision between vehicles or a collision between a person and a vehicle, the robot cleaner of the present invention may acquire evidence by estimating a position or a direction of the accident and then by moving a camera toward the direction. Further, the robot cleaner may be applied not to disturb the movement of an emergency vehicle.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
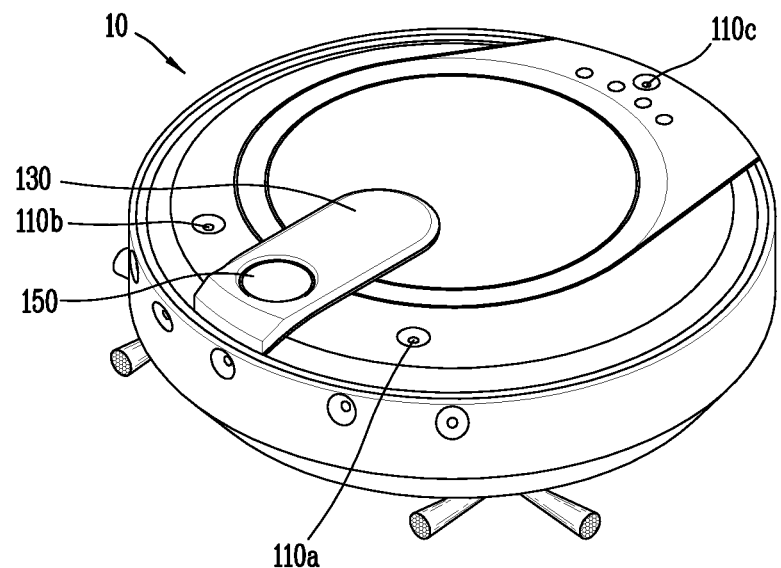
FIG. 1 is a perspective view showing the appearance of a robot cleaner according to preferred embodiments of the present invention.
Figure 2:
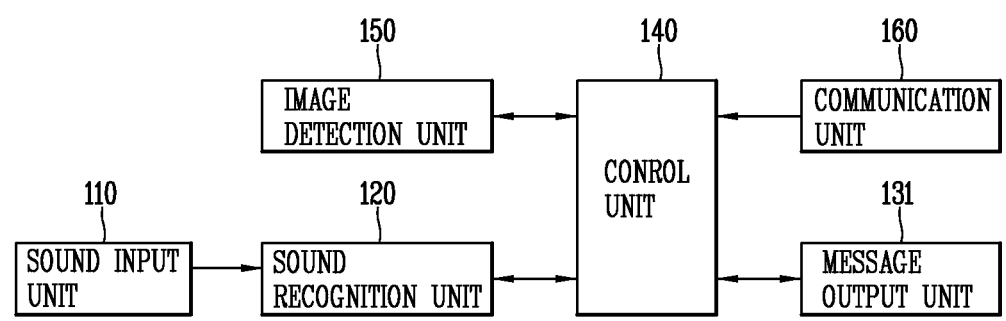
FIG. 2 is a block diagram showing a detailed configuration of a robot cleaner according to one embodiment.

Referring to FIGS. 1 and 2, a robot cleaner according to one embodiment comprises: a sound input unit 110 having one or more microphones, and configured to receive an ambient sound; a sound recognition unit 120 configured to recognize the received ambient sound, in a separation manner into an event sound and an environmental sound; and a message output unit 131 configured to output a message corresponding to the event sound or the environmental sound. Here, the event sound indicates a breaking sound of an object such as a window, a human sound or an animal sound, a foot sound, a falling sound of an object, a sound of explosion, a gun sound, etc. The environmental sound indicates a unique sound of the circumstances, and includes noise, etc. The environmental sound is variable according to a position where the robot cleaner is located. For instance, in case of a living room where a television is turned on, the environmental sound includes a sound emitted from the television.

The sound input unit 110 may be configured in the form of a multi-channel microphone array. The sound input unit 110 includes said at least three microphones. As shown in FIG. 1, three microphones are disposed inside or outside the robot cleaner with constant distances from each other. Such arrangement may be determined through experiments, so that a direction or a position of a sound source with respect to an event sound can be easily detected.

The sound recognition unit 120 performs sound source beam forming so that only a sound from a sound source can be received, the sound source of which direction has been firstly estimated. That is, the sound recognition unit 120 enhances a sound quality based on (or using) a sound source separating technique. The sound recognition unit 120 recognizes only a defined specific event sound, while rejecting an environmental sound or an undefined sound. Also, the sound recognition unit 120 verifies the reliability on the recognized event sound.

The message output unit 131, a sort of the output unit 130, is configured to output a recognized event sound, a position of a sound source, a direction of a sound source, a sound type, etc., in the form of a message. The message output unit 130 may be further provided with a speaker, etc., and may output such information after converting into an alarm sound, a voice message, etc.

Referring to FIG. 2, the robot cleaner control unit further comprises a control unit 140 configured to detect a direction or a position of a sound source with respect to the event sound. In a case where the control unit 140 is provided with two or more microphones, the control unit 140 detect a direction or a position of a sound source, based on a time difference of sound sources generated from the respective microphones. The sound source direction or the sound source position may be detected by the sound recognition unit 120.

Figure 5:
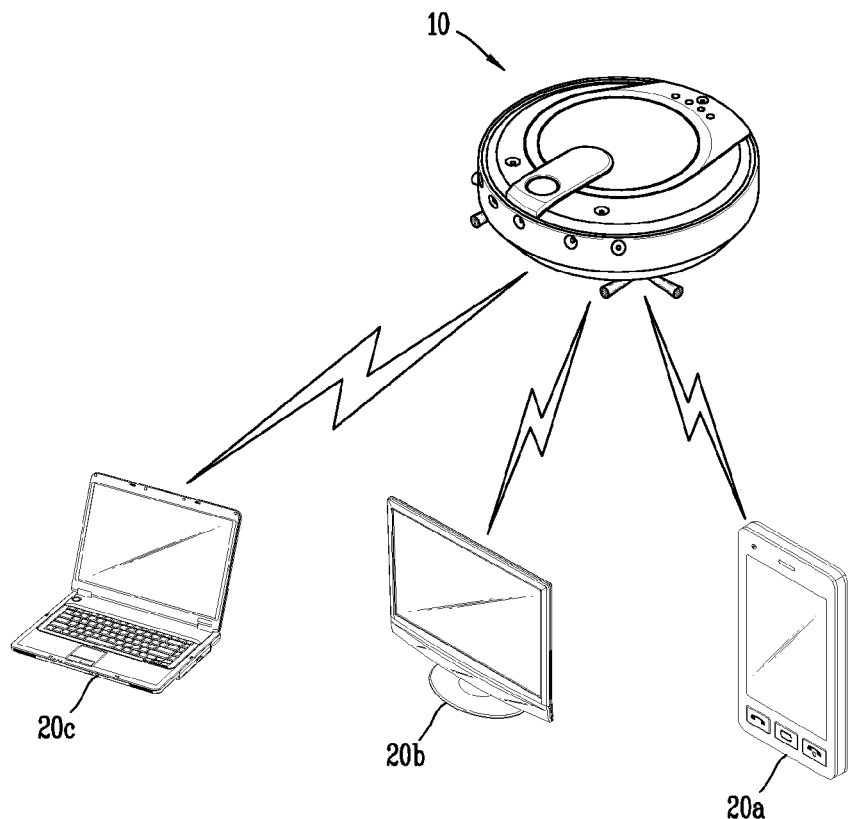
FIG. 5 is a view schematically showing a remote monitoring system using a robot cleaner according to one embodiment.

As shown in FIG. 5, the robot cleaner 10, and a terminal device 20 connected to the robot cleaner 10 via a communication network, may constitute a remote controlling system. The terminal device 20 may receive information from the robot cleaner, and then provide the received information to a user. The terminal device 20 may receive a control command from a user, and generate a control signal based on the control command, thereby remotely-controlling the robot cleaner.

The terminal device 20 may be classified into a mobile/portable terminal and a stationary terminal according to a moveable state, which includes both of the mobile terminal and the stationary terminal. Further, the terminal device 20 may be classified into a handheld terminal and a vehicle-mount terminal according to a user's directly-moveable state, which includes both of the handheld terminal and the vehicle-mount terminal. For instance, the terminal device includes a cellphone (PCS phone), a smart phone, a notebook computer (laptop computer), a digital broadcasting terminal, a PDA (Personal Digital Assistants), a PMP (Portable Multimedia Player), a navigation, etc. The remote controlling system may have a different network scheme according to a type of the terminal device. For instance, a portable phone or a smart phone, etc. may adopt a mobile communication network such as 3G, CDMA and WCDMA. And, the robot cleaner and the terminal device transmit and receive wireless signals, via a mobile communication network, with a base station, an external terminal, a server, etc.

Referring to FIGS. 1 and 2, the robot cleaner further comprises an image detection unit 150 configured to detect image information by capturing the sound source position. The image detection unit 150 is provided with an upper camera sensor installed towards the upper side or the front side. In a case where the image detection unit 150 is provided with a plurality of upper camera sensors, the camera sensors may be formed on an upper part or a side surface of the robot cleaner with a constant distance from each other, or at constant angles from each other.

Once the sound recognition unit 120 recognizes an event sound, the control unit 140 detects a position or a direction of a sound source with respect to the event sound. And, the control unit 140 moves the robot cleaner to the sound source position or the sound source direction. Then, the image detection unit 150 detects image information by capturing the periphery of the corresponding sound source position. The control unit 140 may determine whether an abnormal situation has occurred or not based on the consecutively-detected image information. For instance, the control unit 140 determines the movement of an object based on (or using) the consecutively-detected image information, and determines whether housebreaking or fire has occurred, based on the determined movement. The message output unit 131 may further output an alarm message in the occurrence of an abnormal situation.

The image detection unit 150 may be used as another type of position recognition unit. The image detection unit 150 may further include a lens connected to a camera and focusing on a subject, a controller configured to control the camera, and a lens controller configured to control the lens. As the lens, used is a lens having a wide view angle so that a peripheral wide area can be captured from a prescribed position. The control unit 140 may extract feature points from image information captured by the image detection unit, may recognize the position of the robot cleaner based on the feature points, and may create a cleaning map with respect to a cleaning region.

The robot cleaner further comprises a communication unit 160 configured to transmit, via a communication network, the message, or the image information, or both of the message and the image information. The communication unit 160 is connected to a terminal device, etc., by one of a wired communication method, a wireless communication method and a satellite communication method, i.e., one of currently-available communication methods, thereby transmitting a message, sound information, image information, etc. to the terminal device, and receiving data from the terminal device. The communication unit 160 receives a control signal from the terminal device. The communication unit 160 transmits, to the terminal device, state information, obstacle information, position information, a cleaning map, etc. with respect to the robot cleaner. Further, the communication unit 160 may perform communication with the terminal device, using one of short-range radio communication methods, such as radio frequency (RF) communication, Bluetooth, Infrared communication (IrDA), a wireless LAN, and zigbee. For instance, when the terminal device is a smart phone, the robot cleaner may be provided with a communication unit according to a communication scheme where the smart phone is available.

Figure 4:
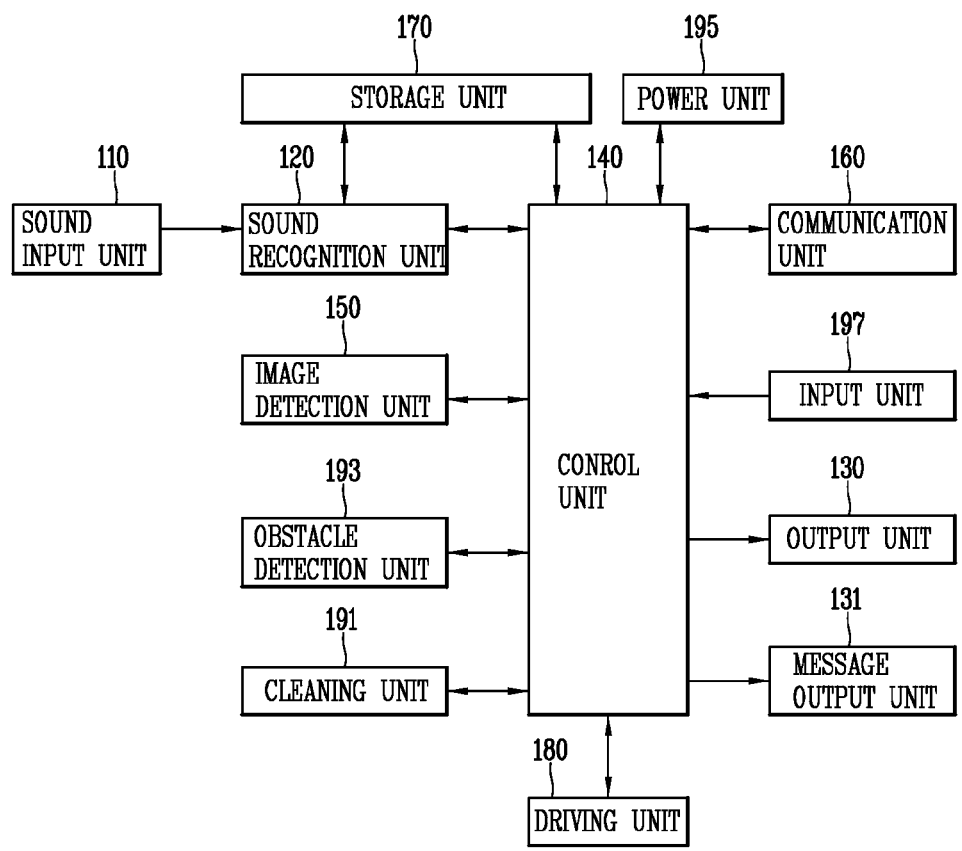
FIG. 4 is a block diagram showing a detailed configuration of a robot cleaner according to another embodiment.

Referring to FIGS. 1 and 4, a robot cleaner according to another embodiment comprises a cleaner body, a driving unit 180, a cleaning unit 191, a sound input unit 110, a sound recognition unit 120, and a control unit 140.

The driving unit 180 is provided with one or more wheel motors for driving one or more wheels installed at a lower part of the cleaner body, and is configured to move the cleaner body by a driving signal. The robot cleaner is provided with right and left main wheels on the right and left sides of a lower part thereof. A handle for facilitation of a user's grasp may be installed on two side surfaces of the main wheels. The wheel motors are connected to the main wheels, respectively, so that the main wheels can rotate. The wheel motor operate independently from each other, and can rotate in two directions. The robot cleaner is provided with one or more auxiliary wheels on the rear surface thereof, thereby supporting the cleaner body, minimizing friction between the lower surface of the cleaner body and the bottom surface (surface to be cleaned), and smoothly moving the robot cleaner.

The cleaning unit 191 is provided with a suction motor for sucking air, is provided with a dust collecting means, and is configured to suck foreign materials. That is, the cleaning unit 191 includes a dust box configured to store collected dust therein, a suction fan configured to provide a driving force for sucking dust which is within a cleaning area, and a suction motor configured to suck air by rotating the suction fan. And, the cleaning unit 191 is configured to suck peripheral dust or foreign materials. The cleaning unit 191 further includes a rotation brush rotatably mounted to a lower part of the cleaner body, and a side brush configured to clean the edge or the corner of a cleaning region such as a wall, while rotating about a rotation shaft disposed in a vertical direction of the cleaner body. The rotation brush is configured to float dust which is on the floor or a carpet into the air, while rotating a right-left shaft of the cleaner body. A plurality of blades are provided on the outer circumferential surface of the rotation brush in a spiral direction. The brushes may be provided between the blades.

The sound input unit 110 is provided with one or more microphones inside or outside the cleaner body, and is configured to receive an ambient sound. The sound recognition unit 120 is configured to recognize the received ambient sound, in a separation manner into an event sound and an environmental sound. The control unit 140 is configured to detect a direction or a position of a sound source with respect to the event sound, and to generate a driving signal.

Referring to FIG. 4, the robot cleaner further comprises a message output unit 131 configured to output a message corresponding to the event sound or the environmental sound. The robot cleaner may further comprise an image detection unit 150 configured to detect image information by capturing the periphery of the sound source position. The robot cleaner may further comprise a communication unit 160 configured to transmit, via a communication network, the message, or the image information, or both of the message and the image information. The message output unit, the image detection unit, and the communication unit have been aforementioned in one embodiment, and thus detailed explanations thereof will be omitted.

Referring to FIGS. 1 and 4, the robot cleaner according to preferred embodiments of the present invention may further comprise an obstacle detection unit 193 having one or more sensors, and configured to output obstacle information by detecting a peripheral obstacle. The control unit 140 creates a cleaning map based on the obstacle information.

As shown in FIG. 1, the obstacle detection unit 193 includes first sensors installed on the front surface, i.e., on the outer circumferential surface of the robot cleaner, with constant intervals from each other. The obstacle detection unit 193 may include second sensors protruding towards the outside of the cleaner body. The positions and the types of the first and second sensors may be variable according to a type of the robot cleaner. And, the obstacle detection unit may include various sensors. The first sensors are configured to detect an object disposed on a moving path of the robot cleaner, i.e., an obstacle, and is configured to transmit detection information to the control unit 140. More specifically, the first sensors detect protrusions, home appliances, furniture, a wall surface, a wall edge, etc., disposed on a moving path of the robot cleaner, and transmits obstacle information to the control unit. The first sensor may be implemented as an infrared ray sensor, an ultrasonic sensor, an RF sensor, a geomagnetic sensor, etc. The second sensors are configured to detect an obstacle disposed on the front side or the lateral side, and to transmit obstacle information to the control unit. That is, the second sensors detect protrusions, home appliances, furniture, a wall surface, a wall edge, etc., disposed on a moving path of the robot cleaner, and transmits obstacle information to the control unit. The second sensor may be implemented as an infrared ray sensor, an ultrasonic sensor, an RF sensor, a PSD (Position Sensitive Device) sensor, etc.

The obstacle detection unit 193 may further include a cliff sensor installed at the bottom surface of the cleaner body, and configured to detect an obstacle which is on the floor, e.g., a cliff. The cliff sensor is configured to obtain stable measurement values regardless of reflectivity of the floor and a color difference. Like the PSD sensor, the cliff sensor may be implemented in the form of an infrared ray module.

The obstacle detection unit 193 may further include a charging signal sensor for receiving a guide signal generated from a charging station. The robot cleaner receives a guide signal transmitted from the charging station using the charging signals sensor, thereby checking a position and a direction of the charging station. The charging station generates a guide signal indicating a direction and a distance so that the robot cleaner can return to the charging station. The robot cleaner receives the guide signal transmitted from the charging station, determines the current position and sets a moving direction. Then, the robot cleaner returns to the charging station. The charging signal sensor may be implemented as an infrared ray sensor, an ultrasonic sensor, a radio frequency (RF) sensor, etc., and may be generally used as an infrared ray sensor. The charging signal sensor is provided at an inner or outer side of the robot cleaner. For instance, the charging signal sensor may be installed below the output unit 130, or at the periphery of the image detection unit 150.

The robot cleaner may further comprise a position recognition unit (not shown) having one or more sensors, and configured to output position information by recognizing a position of the robot cleaner based on detection signals acquired from the sensors. The control unit 140 may correct a cleaning map using the position information output from the position recognition unit. Further, the control unit 140 may more precisely detect a position or a direction of a sound source with respect to an event sound, using the obstacle information detected by the obstacle detection unit, the position information recognized by the position recognition unit, the cleaning map, etc.

The position recognition unit includes a lower camera sensor provided on the rear surface of the robot cleaner, and configured to capture the floor (i.e., a surface to be cleaned) while the robot cleaner moves. The lower camera sensor is called an 'optical flow sensor', and converts a lower side image inputted from an image sensor provided therein thus to create a predetermine type of image data. The lower camera data may detect the position of the robot cleaner regardless of sliding of the robot cleaner. The control unit 140 real-time compares image data captured by the lower camera sensor to each other, thus to calculate a moving distance and a moving direction, thereby calculating the position of the robot cleaner. As the lower side of the robot cleaner is observed by the lower camera sensor, the controller can compensate for an error due to sliding of the robot cleaner, the sliding occurred on a position calculated by other means.

The position recognition unit further includes an acceleration sensor configured to sense a change of a moving speed, due to start, stop, direction conversion, collision with an object, etc. The acceleration sensor may be attached to a region close to the main wheels or the auxiliary wheels, and may sense sliding or idle rotation of the wheels. A moving speed of the robot cleaner may be calculated based on an acceleration sensed by the acceleration sensor, and the calculated moving speed is compared with a reference speed, thereby estimating or compensating for the position of the robot cleaner. However, the acceleration sensor is generally mounted in the control unit, and senses a speed change of the robot cleaner occurring in a cleaning mode or a running mode. That is, the acceleration sensor senses an impact amount due to a speed change, and outputs a voltage corresponding to the impact amount. Accordingly, the acceleration sensor may perform functions of an electronic bumper.

The position recognition unit further includes a gyro sensor configured to sense a rotation direction and a rotation angle when the robot cleaner moves or cleans. The gyro sensor senses an angular speed of the robot cleaner, and outputs a voltage proportional to the angular speed. The control unit 140 calculates a rotation direction and a rotation angle of the robot cleaner based on the voltage outputted from the gyro sensor.

The position recognition unit may further include wheel sensors connected to the right and left main wheels, and sensing RPMs of the right and left main wheels. The wheel sensors may be implemented as a rotary encoder. When the robot cleaner moves in a running mode or a cleaning mode, the rotary encoder senses RPMs of the right and left main wheels, and outputs the sensed RPMs. The control unit 140 may calculate rotation speeds of the right and left main wheels based on the sensed RPMs.

The control unit 140 may precisely recognize the position of the robot cleaner based on detection information sensed by the acceleration sensor, the gyro sensor, the wheel sensor and the lower camera sensor, and image information acquired by the image detection unit. And, the control unit 140 may precisely create a cleaning map based on the position of the robot cleaner, the position recognized based on obstacle information acquired by the obstacle detection unit, and image information acquired by the image detection unit. The communication unit 160 transmits, to the terminal device 20, data including image information, obstacle information, position information, the cleaning map, a cleaning region, etc.

The robot cleaner may further comprise an input unit 197 through which a user directly inputs a control command to the robot cleaner. The user may input, through the input unit, a command instructing output of one or more information among stored information. The input unit 197 may be implemented as one or more buttons. For instance, the input unit 197 may include an OK button and a set button. The OK button is used to input a command for certifying obstacle information, position information, image information, a cleaning region, a cleaning map, etc. The set button is used to input a command for setting such information. The input unit may be provided with a reset button for inputting a command for resetting such information, a deletion button, a cleaning start button, a stop button, etc. As another example, the input unit 197 may be provided with a button for setting reservation information, or a button for deleting reservation information. The input unit 197 may be further provided with a button for setting a cleaning mode, or a button for changing a cleaning mode. The input unit 197 may be further provided with a button for inputting a command instructing the robot cleaner to return to a charging station. The input unit 197 may be installed at an upper part of the robot cleaner, in the form of hard or soft keys, a touch pad, etc. The input unit 197 may be implemented in the form of a touch screen together with the output unit 130.

As shown in FIG. 1, the output unit 130 is installed at an upper part of the robot cleaner. However, the installation position or the installation type may be variable. For instance, the output unit 130 outputs, to a screen, reservation information, a battery state, intensive cleaning, space extension, a cleaning or running operation in a zigzag form, etc. The output unit 130 may output the current cleaning state of the robot cleaner, and the current state of each unit of the robot cleaner. The output unit 130 may display, on the screen, obstacle information, position information, image information, a cleaning map, a cleaning region, etc. The output unit 130 may be implemented as one of a light emitting diode (LED), a liquid crystal display (LCD), a plasma display panel (PDP), and an organic light emitting diode (OLED).

The robot cleaner may further comprise a power unit 195. The power unit 195 is provided with a chargeable battery to supply power into the robot cleaner. The power unit 195 supplies, to each unit, a driving power and an operation power required when the robot cleaner moves or when the robot cleaner performs a cleaning operation. When the remaining amount of power is deficient, the robot cleaner moves to a charging station to be supplied with a charging current. The robot cleaner further comprises a battery sensing unit (not shown) configured to sense a charged state of a battery, and to transmit detection information to the control unit 140. The remaining amount of battery power may be displayed on the screen of the output unit. The control unit 140 presets a reference value (on battery remaining amount), and compares the battery remaining amount with the reference value. If the battery remaining amount is less than the reference value as a result of the comparison, the control unit 140 moves the robot cleaner to a charging station for charging.

Referring to FIG. 4, the robot cleaner may further comprise a storage unit 170 configured to store therein at least one of image information, obstacle information, position information, a cleaning map and a cleaning region. The storage unit 170 is configured to store therein a control program for controlling the robot cleaner, and data associated with the control program. The storage unit 170 may further store therein a cleaning type and a running type. As the storage unit 170, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

The storage unit 170 may further store therein an event sound model with respect to the event sound, and an environmental sound model with respect to the environmental sound. Such models may be stored in a storage portion provided at the sound recognition unit or the control unit. The event sound model and the environmental sound model may be implemented in the form of GMM (Gaussian Mixture Model).

The sound recognition unit 120 may include a first recognition portion 121 configured to recognize the ambient sound at intervals of first time, and recognize the event sound based on the event sound model; a second recognition portion 122 configured to recognize the ambient sound at intervals of first time, and recognize the environmental sound based on the environmental sound model; and a third recognition portion 123 configured to recognize the ambient sound at intervals of second time longer than the first time, and recognize the environmental sound based on the environmental sound model. The sound recognition is performed by matching a sound with an environmental sound model and an event sound model, each model pre-stored in the form of data. Such modeling may be performed in various manners. However, it is preferable to use HMM (Hidden Markov Model) and GMM.

The first and second times are preset, which may be determined through experiments according to a sound type, etc. The environmental sound is preferably recognized by analyzing data more than the second time. However, the event sound is preferably recognized at intervals of first time, because the event sound is generated to disappear within a very short time. For instance, the first time may be set as 0.3 sec, 0.5 sec, etc., and the second time may be set as 1 sec, 3 sec, etc.

The sound recognition unit 120 may update the event sound model based on (or using) the environmental sound recognized by the third recognition portion. That is, the robot cleaner adapts to the circumstances. As a result, a recognition rate of an event sound is increased. Unlike in experimental circumstances, in the actual circumstances where a specific event sound and an environmental sound are mixed with each other, it is difficult to recognize the event sound and the environmental sound in a separation manner. For an enhanced recognition rate, generated is an event sound model adaptive to the given circumstances. For instance, in order to more precisely recognize an event sound occurring from noise circumstances, the current environmental sound is added to a previously-trained model. Here, used is a method for calculating an average variation value (mean variance) of the environmental sound and then adapting the calculated value to the existing model, which includes an adapting algorithm such as ML (Maximum Likelihood), MAP (Maximup A Posteriori) and MLLR (Maximum Likelihood Linear Regression).

Figure 3:
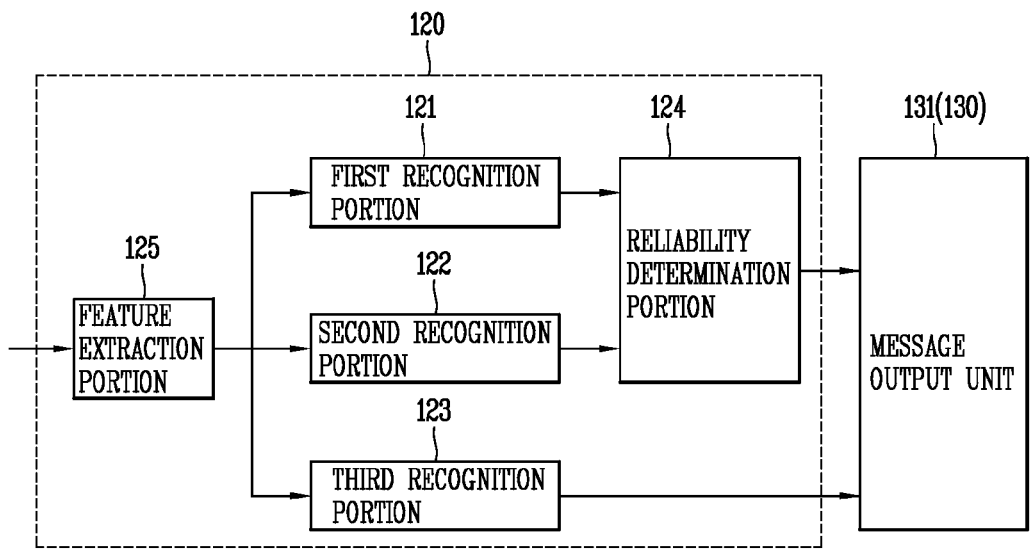
FIG. 3 is a detailed block diagram showing a sound recognition unit of a robot cleaner according to preferred embodiments of the present invention.

Referring to FIG. 3 back, the sound recognition unit 120 further includes a reliability determination portion 124 configured to determine reliability on a recognition result acquired by first recognition portion, based on a recognition result acquired by the second recognition portion, as well as the recognition result acquired by the first recognition portion. That is, the reliability determination portion 124 is configured to determine the reliability by driving the environmental sound recognition portion and the event sound recognition portion in parallel, and by allowing the two recognition portions to exchange information with each other.

The reliability determination portion 124 compares a chance (likelihood, probability or possibility) of a first event sound having the largest likelihood (or chance) among recognition results acquired by the first recognition portion, with a likelihood (or chance) of a first environmental sound having the largest likelihood (or chance) among recognition results acquired by the second recognition portion. If the likelihood (or chance) of the first event sound is greater than that of the first environmental sound as a result of the comparison, the reliability determination portion 124 outputs the first event sound. The likelihood (or chance) indicates the likelihood of a corresponding sound, which is a sort of probability. In order to recognize an event sound, the first recognition portion and the second recognition portion recognize sounds in parallel at intervals of first time. The first recognition portion 121 and the second recognition portion 122 perform a primary refusal when each recognition result is less than a preset reference value. That is, the first recognition portion 121 and the second recognition portion 122 prevent mal-recognition through refusal. If the likelihood of an event sound acquired by the first recognition unit is less than that of an environmental sound acquired by the second recognition unit, the robot cleaner performs refusal. In this case, it is determined that no specific event sound has occurred.

If the difference between the first event sound having the largest likelihood (or chance) and a second event sound having the second largest likelihood (or chance) is more than a reference value, the reliability determination portion 124 outputs the first event sound. If the likelihood (or chance) of the first event sound having the largest likelihood (or chance) is greater than that of the first environmental sound having the largest likelihood (or chance), the reliability determination portion 124 compares the likelihood (or chance) of the first event sound, with the likelihood (or chance) of the second event sound. If the difference between the likelihood (or chance) of the first event sound and the likelihood (or chance) of the second event sound is greater than a reference value, the sound recognition unit 120 determines that an event sound has occurred. On the contrary, if the difference between the likelihood (or chance) of the first event sound and the likelihood (or chance) of the second event sound is less than the reference value, the robot cleaner performs refusal.

Referring to FIG. 3 back, the sound recognition unit 120 further includes a feature extraction portion 125 configured to extract feature vectors, from the ambient sound, based on (or using) a sound processing technique, and configured to output the extracted feature vectors to the first to third recognition portions. The sound processing technique serves to facilitate sound recognition by performing extraction, amplification, filtering, conversion, etc. with respect to a sound. As the sound processing technique, may be used a linear log scale conversion technique.

Figure 6:
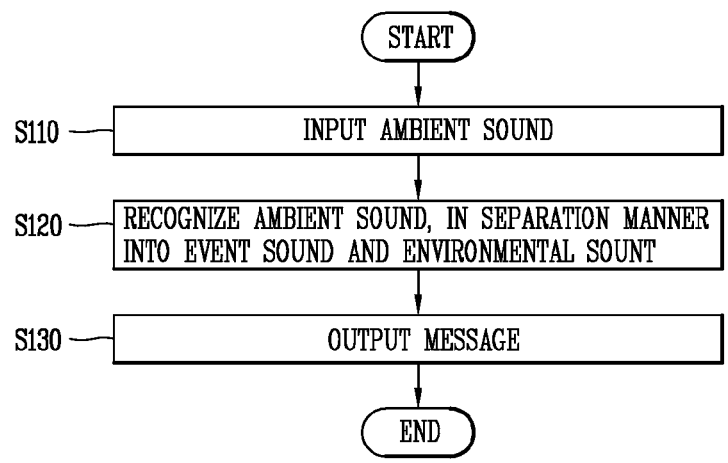
FIGS. 6 and 7 are flowcharts showing a method for controlling a robot cleaner according to preferred embodiments of the present invention.

Referring to FIG. 6, a method for controlling a robot cleaner according to one embodiment comprises: receiving an ambient sound based on (or using) one or more microphones (S110); recognizing the received ambient sound, in a separation manner into an event sound and an environmental sound (S120); and outputting a message corresponding to the event sound or the environmental sound (S130). The event sound indicates a breaking sound of an object such as a window, a human sound or an animal sound, a foot sound, a falling sound of an object, a sound of explosion, a gun sound, etc. The environmental sound indicates a unique sound of the circumstances, and includes noise, etc. The environmental sound is variable according to a position where the robot cleaner is located. For instance, in case of a living room where a television is turned on, the environmental sound includes a sound emitted from the television.

The robot cleaner receives the ambient sound using a multi-channel microphone array (S110). For instance, the robot cleaner includes at least three microphones. In a case where the robot cleaner is provided with three microphones as shown in FIG. 1, the three microphones are disposed inside or outside the robot cleaner with constant distances from each other. Such arrangement may be determined through experiments, so that a direction or a position of a sound source with respect to an event sound can be easily detected.

The robot cleaner performs sound source beam forming so that only a sound from a sound source can be received, the sound source of which direction has been firstly estimated. That is, the robot cleaner enhances a sound quality based on (or using) a sound source separating technique. The robot cleaner recognizes only a defined specific event sound, while rejecting an environmental sound or an undefined sound (S120). Also, the robot cleaner verifies the reliability on the recognized event sound.

Then, the robot cleaner outputs a recognized event sound, a sound source position, a sound source direction, a sound type, etc., in the form of a message (S130). The robot cleaner may output such information by converting into an alert sound, a voice message, etc., using a speaker, etc.

Figure 7:
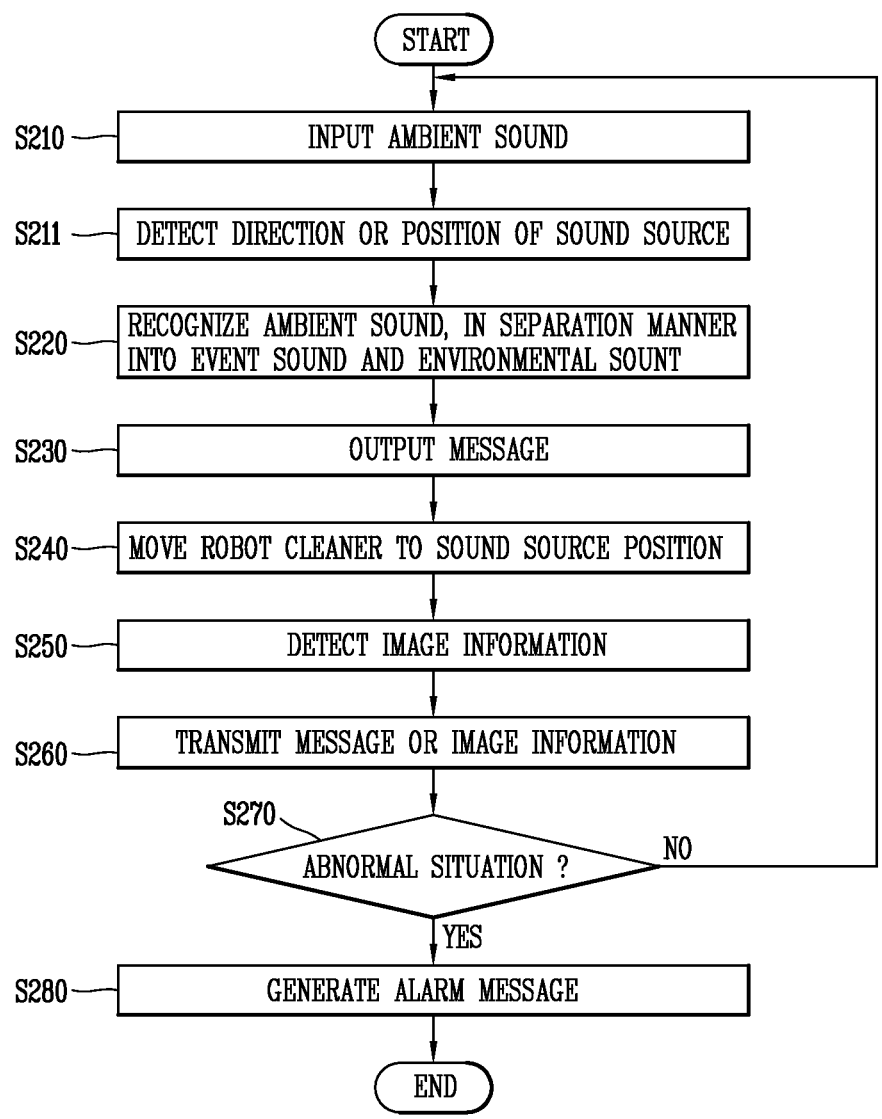

Referring to FIG. 7, a method for controlling a robot cleaner according to another embodiment comprises: receiving an ambient sound using one or more microphones (S210); detecting a direction or a position of a sound source with respect to the ambient sound (S211); recognizing the received ambient sound, in a separation manner into an event sound and an environmental sound (S220); outputting a message corresponding to the event sound or the environmental sound (S230); moving the robot cleaner to the sound source position (S240); and detecting image information on the sound source position (S250). The method further comprises transmitting, via a communication network, the message, or the image information, or both of the message and the image information (S260).

The robot cleaner detects a direction or a position of a sound source with respect to the event sound (S211). For instance, in case of having two or more microphones, the robot cleaner detects a sound source direction or a sound source position using a time difference of sounds generated from the respective microphones. Then, the robot cleaner moves to the corresponding sound source direction or sound source position (S240), and detects image information by capturing the periphery using a camera on the corresponding sound source position (S250). The robot cleaner may determine whether an abnormal situation has occurred or not, based on the consecutively-detected image information (S270). For instance, the robot cleaner determines the movement of an object using the consecutively-detected image information, and determines whether housebreaking or fire has occurred, based on the determined movement. The robot cleaner may further output an alarm message in the occurrence of an abnormal situation has occurred.

The robot cleaner may transmit the message, or the image information, or both of the message and the image information, to a user's terminal device, via a communication network (S280). The robot cleaner is connected to the terminal device, etc., by one of a wired communication method, a wireless communication method and a satellite communication method, i.e., one of currently-available communication methods, thereby transmitting a message, sound information, image information, etc., to the terminal device, and receiving a control signal from the terminal device.

Figure 8:
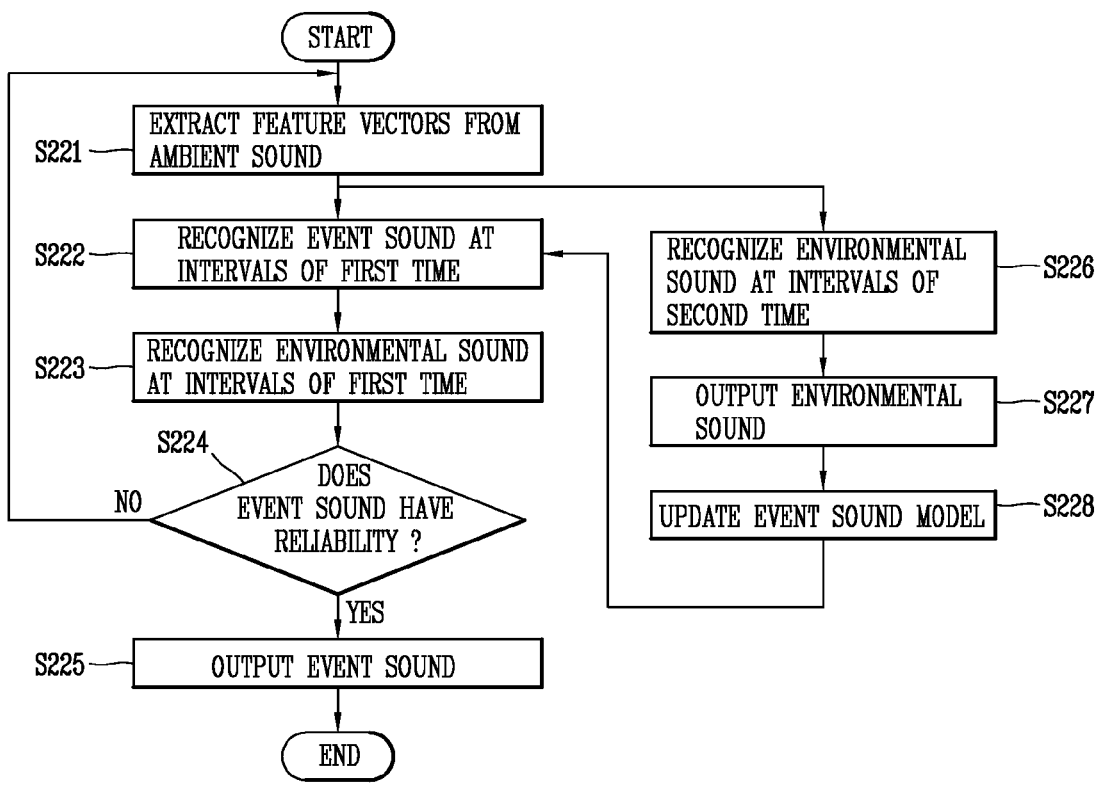
FIG. 8 is a flowchart for explaining a sound recognition operation of a robot cleaner according to preferred embodiments of the present invention.

Referring to FIG. 8, the step of recognizing the received ambient sound (S120, S220) includes extracting feature vectors from the ambient sound, using a sound processing technique (S221); a first recognition process (S222) for recognizing the event sound at intervals of first time, based on the feature vectors and an event sound model with respect to the event sound; a second recognition process (S223) for recognizing the environmental sound at intervals of first time, based on the feature vectors and an environmental sound model with respect to the environmental sound; a third recognition process (S226) for recognizing the environmental sound at intervals of second time longer than the first time, based on the feature vectors and the environmental sound model; and determining reliability on the recognized event sound based on a recognition result acquired in the second recognition process, as well as a recognition result acquired in the first recognition process (S224). The step of recognizing the ambient sound (S120, S220) further include updating the event sound model using the environmental sound recognized in the third recognition process (S228).

The robot cleaner extracts feature vectors, from the ambient sound, using a sound processing technique (S221). The sound processing technique serves to facilitate sound recognition by performing extraction, amplification, filtering, conversion, etc. with respect to a sound. As the sound processing technique, may be used a linear log scale conversion technique.

The robot cleaner recognizes an event sound at intervals of first time, based on the ambient sound and the event sound model (S222). The robot cleaner recognizes an environmental sound at intervals of first time, based on the ambient sound and the environmental sound model (S223). The robot cleaner recognizes the environmental sound at intervals of second time longer than the first time, based on the ambient sound and the environmental sound model (S226). The sound recognition is performed by matching a sound with an environmental sound model and an event sound model, each model pre-stored in the form of data. Such modeling may be performed in various manners. However, it is preferable to use HMM (Hidden Markov Model) and GMM.

The first and second times are preset, which may be determined through experiments according to a sound type, etc. The environmental sound is preferably recognized by analyzing data more than the second time. However, the event sound is preferably recognized at intervals of first time, because the event sound is generated to disappear within a very short time. For instance, the first time may be set as 0.3 sec, 0.5 sec, etc., and the second time may be set as 1 sec, 3 sec, etc.

The robot cleaner determines the reliability on a recognition result with respect to the event sound, based on a recognition result with respect to the environmental sound (S224). That is, the robot cleaner is configured to determine the reliability by operating an environmental sound recognition portion and an event sound recognition portion in parallel, and by allowing the two recognition portions to exchange information with each other. The robot cleaner compares a chance (likelihood, probability or possibility) of a first event sound having the largest chance among recognition results acquired in the first recognition process (S222), with a chance of a first environmental sound having the largest chance among recognition results acquired in the second recognition process (S223). If the chance of the first event sound is greater than that of the first environmental sound as a result of the comparison, the robot cleaner outputs the first event sound. The chance indicates the likelihood of a corresponding sound, which is a sort of probability. The robot cleaner performs a primary refusal when a recognition result acquired by the first recognition process and a recognition result acquired by the second recognition process are less than preset reference values. If the likelihood of an event sound acquired in the first recognition process (S222) is less than that of an environmental sound acquired in the second recognition process (S223), the robot cleaner performs refusal. In this case, it is determined that no specific event sound has occurred.

If the difference between the first event sound having the largest chance and a second event sound having the second largest chance is more than a reference value, the robot cleaner outputs the first event sound. If the chance of the first event sound having the largest chance is greater than that of the first environmental sound having the largest chance, the robot cleaner compares the chance of the first event sound, with the chance of the second event sound. If the difference between the chance of the first event sound and the chance of the second event sound is greater than a reference value, the robot cleaner determines that an event sound has occurred. On the contrary, if the difference between the chance of the first event sound and the chance of the second event sound is less than the reference value, the robot cleaner performs refusal.

The robot cleaner adapts to the circumstances. As a result, a recognition rate of an event sound is increased. Unlike in experimental circumstances, in the actual circumstances where a specific event sound and an environmental sound are mixed with each other, it is difficult to recognize the event sound and the environment sound in a separation manner. For an enhanced recognition rate, generated is an event sound model adaptive to given circumstances. For instance, in order to more precisely recognize an event sound occurring from noise circumstances, the current environmental sound is added to a previously-trained model. Here, used is a method for calculating an average variation value (mean variance) of the environmental sound and then adapting the calculated value to the existing model, which includes an adapting algorithm such as ML (Maximum Likelihood), MAP (Maximup A Posteriori) and MLLR (Maximum Likelihood Linear Regression).

The present invention may have the following advantages.

Firstly, a sound source direction and a sound source position may be detected by one or more microphones, e.g., three microphones, and a specific event sound may be recognized. Then, the recognized specific event sound may be output to the cleaner body in the form of a message, or may be provided via a communication network. This can allow the circumstances to be easily monitored.

Secondly, a sound recognition function may be updated using the ambient sound, for sound recognition from background noise and environmental noise, in a robust and precise manner. This can enhance a sound recognition rate, and improve stability and efficiency.

Thirdly, the robot cleaner may be moved to a detected direction or position of a sound source with respect to an event sound. Then, image information may be detected, or whether an abnormal situation has occurred or not may be determined. Such information may be provided via a communication network.

Fourthly, in case of a model having a camera, whether an event sound has occurred or not may be detected. This can prevent the occurrence of a blind spot resulting from that the camera cannot capture an object within the range of 360°

Fifthly, a 24-hour automated security monitoring function may be executed with a 24-hour sound recognition service.

Sixthly, the present invention may be applied to a mobile robot in other field, e.g., a security robot for social security capable of providing a safe service to a user by monitoring/securing limited areas independently or in an interworking manner with a security system, and by protecting a human life and property.

Seventhly, in the occurrence of a collision between vehicles or a collision between a person and a vehicle, the robot cleaner of the present invention may acquire evidence by estimating a position or a direction of the accident and then by moving a camera toward the direction. Further, the robot cleaner may be applied not to disturb the movement of an emergency vehicle.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A robot cleaner, comprising:
   a sound input unit having one or more microphones, and configured to receive an ambient sound;
   a sound recognition unit configured to recognize the received ambient sound, in a separation manner into an event sound and an environmental sound;
   a message output unit configured to output a message corresponding to the event sound or the environmental sound;
   a storage unit configured to store an event sound model with respect to the event sound, and an environmental sound model with respect to the environmental sound;
   a control unit configured to detect a direction or a position of a sound source with respect to the event sound;
   an image detection unit configured to detect image information by capturing the periphery of the sound source position; and
   a communication unit configured to transmit, via a communication network, the message, or the image information, or both of the message and the image information,
   wherein the sound recognition unit is configured to:
   recognize a sound of the ambient sound, which matches the event sound model, as the event sound, the ambient sound being recognized at intervals of first time; and
   recognize a sound of the ambient sound, which matches the environmental sound model, as the environmental sound, the ambient sound being recognized at intervals of second time longer than the first time.

2. The robot cleaner of claim 1, wherein the sound input unit includes at least three microphones, and
   wherein said at least three microphones are disposed inside or outside the robot cleaner with constant distances from each other.

3. The robot cleaner of claim 1, wherein the sound recognition unit includes:
   a first recognition portion configured to recognize the event sound at intervals of first time, based on the ambient sound and the event sound model;
   a second recognition portion configured to recognize the environmental sound at intervals of first time, based on the ambient sound and the environmental sound model; and
   a third recognition portion configured to recognize the environmental sound at intervals of second time longer than the first time, based on the ambient sound and the environmental sound model.

4. The robot cleaner of claim 3, wherein the sound recognition unit updates the event sound model based on the environmental sound recognized by the third recognition portion.

5. The robot cleaner of claim 3, wherein the sound recognition unit further includes a reliability determination portion configured to determine reliability on a recognition result acquired by the first recognition portion, based on a recognition result acquired by the second recognition portion, as well as a recognition result acquired by the first recognition portion.

6. The robot cleaner of claim 5, wherein the reliability determination portion compares a likelihood of a first event sound having a largest likelihood among recognition results acquired by the first recognition portion, with a likelihood of a first environmental sound having a largest likelihood among recognition results acquired by the second recognition portion, and
   wherein if the likelihood of the first event sound is greater than that of the first environmental sound as a result of the comparison, the reliability determination portion outputs the first event sound.

7. The robot cleaner of claim 6, wherein if a difference between the first event sound having a largest likelihood and a second event sound having a second largest likelihood is more than a reference value, the reliability determination portion outputs the first event sound.

8. The robot cleaner of claim 3, wherein the sound recognition unit further includes a feature extraction portion configured to extract feature vectors, from the ambient sound, based on a sound processing technique, and configured to output the extracted feature vectors to the first to third recognition portions.

9. A method for controlling a robot cleaner, comprising:
   receiving an ambient sound based on one or more microphones;
   recognizing the received ambient sound, by a sound recognition unit, in a separation manner into an event sound and an environmental sound;
   outputting a message corresponding to the event sound or the environmental sound,
   detecting, using a control unit, a direction or a position of a sound source with respect to the event sound;
   detecting, using an image detection unit, image information by capturing the periphery of the sound source position; and
   transmitting, using a communication unit, via a communication network, the message, or the image information, or both of the message and the image information,
   wherein the step of recognizing the received ambient sound includes:
   recognize a sound of the ambient sound which matches the event sound model, as the event sound, the ambient sound being recognized at intervals of first time; and
   recognize a sound of the ambient sound, which matches the environmental sound model, as the environmental sound, the ambient sound being recognized at intervals of second time longer than the first time.

10. The method of claim 9, further comprising:
    moving a robot cleaner to the sound source position.

11. The method of one of claim 9, the step of recognizing the received ambient sound includes:
    extracting feature vectors from the ambient sound, based on a sound processing technique;
    a first recognition process for recognizing the event sound at intervals of first time, based on the feature vectors and an event sound model with respect to the event sound;
    a second recognition process for recognizing the environmental sound at intervals of first time, based on the feature vectors and an environmental sound model with respect to the environmental sound;

a third recognition process for recognizing the environmental sound at intervals of second time longer than the first time, based on the feature vectors and the environmental sound model; and determining reliability on the recognized event sound based on a recognition result acquired in the second recognition process, as well as a recognition result acquired in the first recognition process.

12. The method of claim 11, wherein the step of recognizing the received ambient sound further includes updating the event sound model based on the environmental sound recognized in the third recognition process.

* * * * *